United States Patent [19]

Stoldt

[11] Patent Number: 4,587,383
[45] Date of Patent: May 6, 1986

[54] ELECTRICALLY POWERED MOBILE APPARATUS AND METHOD WITH SUSPENDED POWER CABLE

[75] Inventor: Erwin F. Stoldt, Longview, Tex.

[73] Assignee: Marathon LeTourneau Company, Longview, Tex.

[21] Appl. No.: 604,470

[22] Filed: Apr. 27, 1984

Related U.S. Application Data

[63] Continuation-in-part of Ser. No. 507,749, Jun. 27, 1983, abandoned.

[51] Int. Cl.⁴ .................. H02G 7/20; H02G 7/02; B65H 75/42; B66D 1/395
[52] U.S. Cl. .................. 191/12 R; 242/86.51; 254/277; 191/12.2 R
[58] Field of Search ......... 180/2.1; 191/12 R, 12.2 R, 191/12.2 A; 248/51; 242/86.51; 254/277, 386

[56] References Cited

U.S. PATENT DOCUMENTS

| | | | |
|---|---|---|---|
| 1,514,148 | 11/1924 | Forssblad | 191/12 R |
| 2,439,010 | 4/1948 | Lange | 191/12 R |
| 3,150,860 | 9/1964 | Nelson | 254/277 X |
| 3,533,483 | 10/1970 | Ballinger | 180/9.52 X |
| 3,695,377 | 10/1972 | Ito et al. | 191/12 R X |
| 3,707,922 | 1/1973 | Dillon | 254/277 X |
| 3,791,628 | 2/1974 | Burns et al. | 254/277 |
| 3,811,017 | 5/1974 | Eisen et al. | 191/12 R |
| 3,861,505 | 1/1975 | Sugimura | 191/12.2 R |
| 3,863,741 | 2/1975 | Mitsuishi et al. | 191/12.2 A |
| 3,882,288 | 5/1975 | Rasmussen | 191/12 R |
| 4,108,264 | 8/1978 | Tanaka | 191/12.2 A X |
| 4,155,538 | 5/1979 | Claassen | 254/277 |
| 4,397,365 | 8/1983 | Harbe et al. | 180/68.5 |

FOREIGN PATENT DOCUMENTS

| | | | |
|---|---|---|---|
| 934718 | 5/1948 | France | 191/12.2 R |
| 617456 | 2/1949 | United Kingdom | 191/12.2 R |

*Primary Examiner*—Robert B. Reeves
*Assistant Examiner*—David F. Hubbuch
*Attorney, Agent, or Firm*—Vinson & Elkins

[57] ABSTRACT

A self-mobile electrically powered machine is provided with an electric cable for supplying power to the machine. The cable is suspended between a rotatable turret, which may include a reel, on the machine and a portable cable tower spaced from the machine. From the cable tower, the cable extends to a remote power source. Constant cable tension is provided by the turret reel, or by a sheaving arrangement on the cable tower. The cable tower base is provided with a slot whereby the machine is used to move the tower to different locations while still being supplied with electricity therefrom.

24 Claims, 9 Drawing Figures

Fig. 5

ELECTRICALLY POWERED MOBILE APPARATUS AND METHOD WITH SUSPENDED POWER CABLE

This is a continuation-in-part of U.S. patent application Ser. No. 507,749, filed June 27, 1983 now abandoned.

BACKGROUND OF THE INVENTION

This invention relates to an electrically powered selfmobile apparatus and method for operating the same and, more particularly, to such an apparatus and method for use in mining operations and the like.

There are a number of environments and circumstances under which it is highly desirable to use electrically powered vehicles and self-mobile machines, rather than those powered by internal combustion engines. For example, in operating such vehicles and machines in enclosed spaces such as sub-surface mines, warehouses, holds of ships, etc., it would be desirable to utilize electric power so as to avoid the poisonous gases and other combustion products of internal combustion engines. There also are circumstances and locations where electrical power is available at much more economical rates than equivalent amounts of liquid fuels. However, for such equipment which is too large to be efficiently powered by rechargeable batteries, this requires the provision of a continuous connection to external electrical power.

There are certain types of large earth handling and mining equipment in common use in which the wheels of the equipment are powered by large electric motors, with the required current being generated by on-board generators powered by internal combustion engines. Efficiencies in manufacturing costs, and economies of operation could be achieved if this equipment also could be provided with a continuous connection to remote electrical power so as to eliminate the need for on-board generators.

Various attempts have been made in the past to provide continuous power connections to mobile machinery and vehicles. See, for example, U.S. Pat. Nos. 4,108,264; 3,986,572; 3,695,377; 3,533,483; 3,412,819; 1,733,242 and 1,473,206. As shown in these prior art references, a principal problem to be overcome in providing continuous power connection to such mobile equipment which does not run on tracks, or in fixed patterns, is the method of handling a flexible power line so as to keep it from being run over or damaged by the equipment, interfering with other operations in the vicinity of the equipment, etc. Various attempts to accomplish this result have included automatic cable take-up devices, overhead guide wires for suspending a flexible cable, sliding electrical contacts to overhead wires, and in U.S. Pat. No. 1,733,242, even hydrogen filled balloons for suspending a flexible cable in the air. Limitations in each of these heretofore has prevented wide application of this technology.

It is accordingly the primary object of the present invention to provide an improved method and apparatus for supplying continuous electrical current to electrically powered mobile equipment of the type used for mining, earth moving, agriculture, materials handling, and similar purposes.

Another object is to provide such method and apparatus in which the mobile equipment has 360 degree freedom of movement and may back, turn, and generally operate freely without danger of fouling or damaging the power line to which it is connected.

Another object is to provide such a method and apparatus in which the operator of the mobile equipment or machine may move the machine and power connection apparatus throughout a very large area without the assistance of other personnel or equipment.

These and other objects and advantages of the invention will become apparent from the following detailed specification of preferred embodiments of the invention read in conjunction with the attached drawing.

DESCRIPTION OF THE PREFERRED EMBODIMENT

Figures 1, 2:
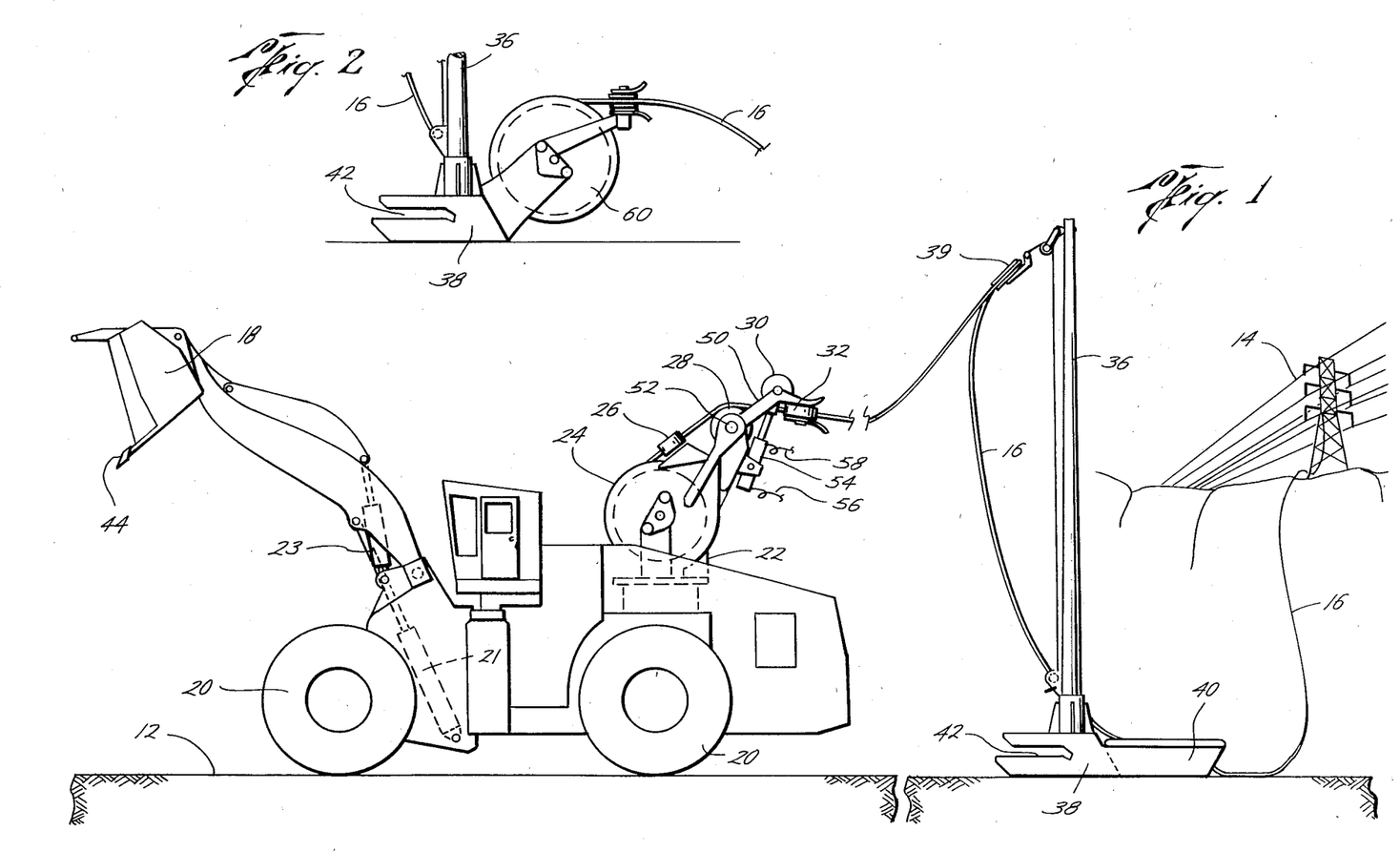
FIG. 1 is a view in side elevation, and partly in perspective, of a piece of mobile electrically powered equipment located on the floor of an open-pit mine and provided with continuous electrical connection to a remote power source outside of the mine.
FIG. 2 is a view in side elevation of an alternate form of the portable cable tower of FIG. 1.

Referring to FIG. 1, there is illustrated an electrically powered self-mobile machine 10 located on the floor 12 of an open pit mine and supplied with continuous electrical power from remote power source 14 by means of a flexible electrical cable 16 inter-connecting the machine and the power source.

The machine 10 is illustrated as a large front-end loader having a bucket 18 for earth handling. However, the present invention is equally applicable to any piece of self-mobile equipment or machinery utilizing continuous connection to a remote power source. On board the loader 10 are one or more electric motors (not shown) which convert electrical power supplied through cable 16 into mechanical energy for driving the wheels 20 of the machine, as well as for supplying hydraulic fluid to operate the cylinders 21 and 23 for the bucket 18, and for other purposes.

In operation, it is desirable that the machine have complete 360 degree freedom of movement, as well as the ability to back-up, go forward, and generally maneuver freely, without the danger of interfering with, fouling or damaging the power cable 16. Accordingly, there is provided on the machine 10 a cable suspension means comprising a turret 22 rotatably mounted for 360 degree freedom of movement about a vertical axis. On the turret 22 there are provided a cable storage reel 24, level wind apparatus 26 and cable fairlead apparatus including idler rollers 28, 30 and 32. Although only a single roller 32 is shown, it will be appreciated that there is provided a pair of such rollers, one being disposed on each side of the cable 16.

The cable fairlead includes a pair of arms 50 which mount the rollers 30 and 32. Arms 50 are pivotally mounted about pivot 52 and are retained in their raised position by double acting cylinder 54, each side of which is supplied with suitable pressurizing fluid through lines 56 and 58 leading to a source of pressurized fluid (not shown). With this arrangement, sudden jerks or movements of the cable 16 relative to the fairlead, resulting from movements of the cable 16, the machine 10 or the turret 22 may be accommodated by temporary pivoting of the arm 50, with the pivoting being accommodated by temporary displacement of pressurizing fluid from one side or the other of cylinder 54 and subsequent automatic replacement of the fluid to return the cylinder 54 and arm 50 of the fairlead to its original position.

The cable storage reel 24 and level wind apparatus 26 are of conventional construction, so that as the flexible cable 16 is reeled in or payed out, as desired, through the idler rollers it will be wound upon or unwound from the cable reel 24 in an orderly fashion. The machine end of the cable 16 is suitably connected by means (not shown) for transmitting electrical power from the cable 16 to the electrical motors on the machine 10 for powering same, which means will maintain a constant electrical connection as the turret 22 rotates with respect to the machine.

The height of the turret 22 is sufficient so that the flexible cable 16, as it enters the turret idler rollers 30 and 32 is elevated above the highest fixed portion of the machine 10, which, in the drawing shown, is the operator's cab 34. Thus, with the bucket 18 in its lowered, working position, the machine has complete freedom of rotation and movement under the elevated cable 16, and the cable 16 is kept off the mine floor 12 where it might be damaged or create a safety hazard. If desired, the turret and fairlead may be dimensioned to suspend the cable 16 at a height greater than any operating height of the shovel 18, as an additional safety measure.

The cable 16 should also be elevated above the mine floor at a second point spaced from the machine 10 in order to provide a clear working area for the machine. For maximum flexibility of operation, such means for elevating the cable preferably are portable so as to be easily moved when the machine 10 is moved to a new work area. In the preferred embodiment, such portable means for suspending the cable are provided by a portable cable tower comprising a base 38 and a mast 36. Means are provided on the mast, such as pulley 39, for holding a portion of the cable 16 a desired distance above the mine floor. An open compartment 40 in the base 38 provides a means for storage of additional cable 16, from which the cable 16 extends to a remote power source 14. The remote power source may be commercial power lines as shown, a generating station, an electrical substation, or other suitable source of line current.

Means are provided on the portable cable tower for engagement by the electrically powered machine 10 to permit the machine to move the tower and itself to a new working area within the mine. In the illustrated embodiment these comprise a slot 42 in the front of the base 38 engagable with the lower blade 44 on the machine bucket 18, so that the bucket may be used to lift the base 38 and mast 36 for movement to a new working location.

If preferred, the open cable storage compartment 40 in the base 38 may be replaced by alternate means for cable storage, such as the additional cable reel 60 shown in FIG. 2. With this alternate embodiment, in order to facilitate reeling and unreeling cable 16 from the additional reel 60, it is preferred that the cable 16 be discontinuous, with means, not shown, being provided for maintaining continuous electrical contact between the first section of cable 16 extending from the machine 10 and downwardly from the mast 36 and the second section of cable 16 wound upon the reel 60.

In operation, the portable cable tower is positioned at a desired location on the mine floor where it will not interfere with the operation of the front-end loader 10 or personnel or other equipment operating in the immediate vicinity of the loader. The loader 10 then moves to its desired working location with cable 16 being unreeled, as required, from the reel 24, but with sufficient tension being maintained in the cable so that it will be suspended in a generally catenary curve between the mast 36 and the top of turret 22. As the loader 10 is operated, it may then back, move forward and turn within limited distances with the turret 22 acting as an idler and rotating in the desired direction so as to keep the turret end of the cable pointed generally at the mast 36 of the portable cable tower. The cable reel 24 may be provided with appropriate apparatus (not shown) for maintaining an essentially constant tension on the cable 16, so that additional cable will be taken in or payed out automatically to compensate for movements of the loader 10 with respect to the portable cable tower.

It will be apparent that the apparatus will have a maximum desirable working radius around the mast 36 which will be determined by the strength and weight of the cable 16, mast 36 and base 38. When it is desired to move the mast 36 and base 38 to a new working location within the mine, the lower lip 44 of the bucket 18 is inserted into the slot 42 in the base 38 so that the base and mast may be moved by the loader 10 to a desired new working location. Additional cable 16 required for movement of the cable tower to a new location may be payed out from a loose coil of cable in the base compartment 40 or from a cable storage reel, if provided in lieu of the open compartment 40. Alternatively, if the new working location is closer to the source of the remote power 14, additional cable 16 may be coiled into compartment 40 for storage or wound upon a reel, if provided.

Figure 3:
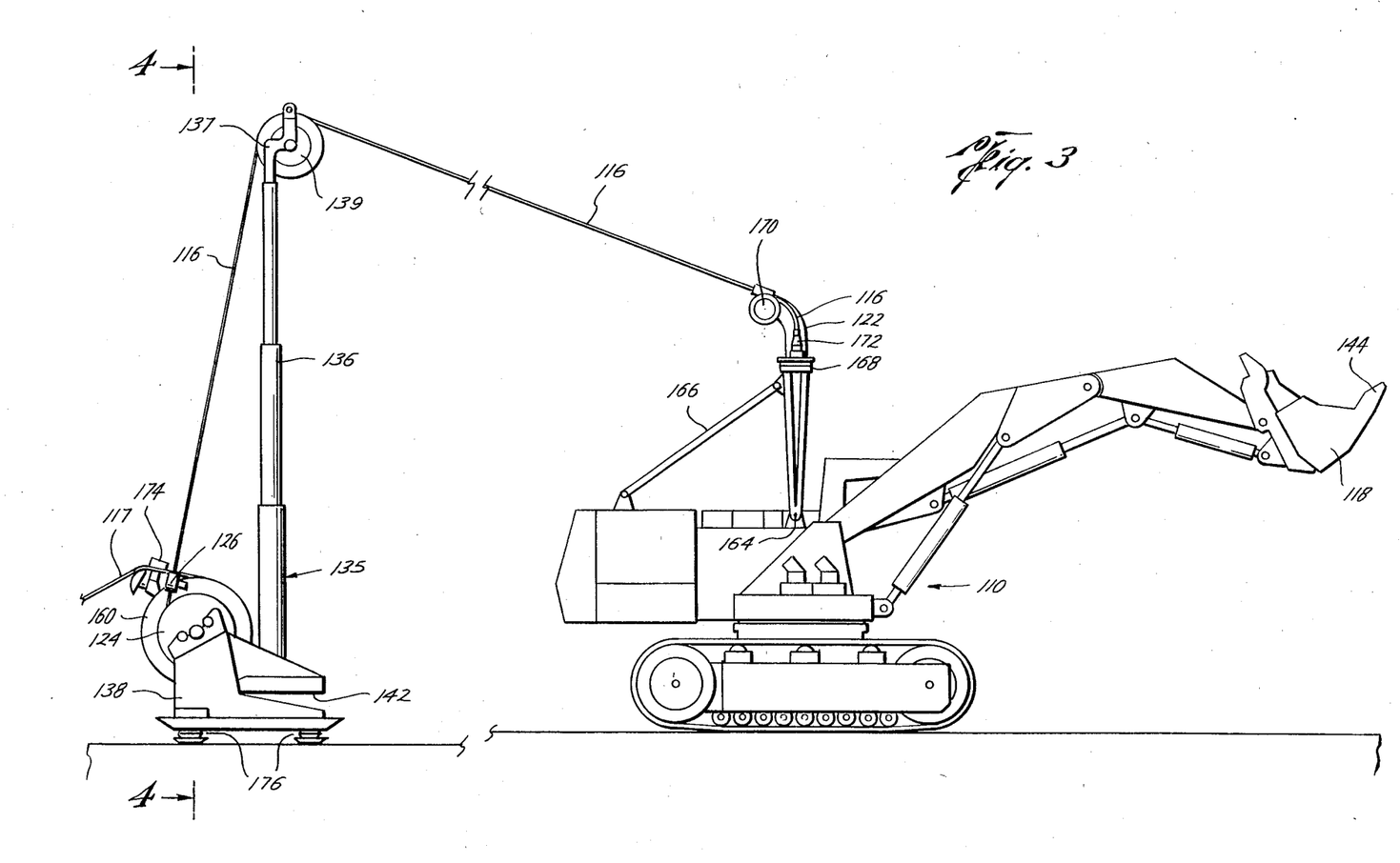
FIG. 3 is a view in side elevation of a piece of mobile electrically powered equipment provided with an alternate form of the apparatus of the present invention for supplying electrical power to the equipment.
Figure 4:
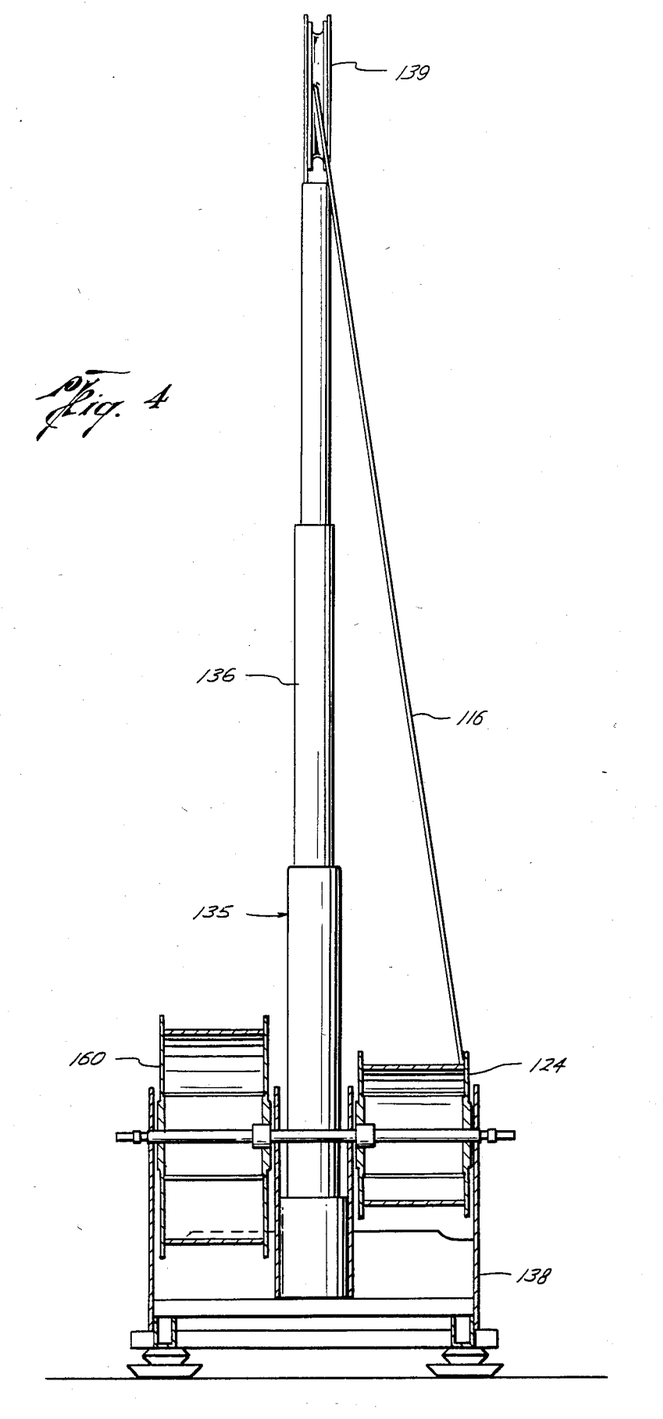
FIG. 4 is a view in side elevation, and partly in section, taken along line 4—4 of FIG. 3 and illustrating details of the alternate form of the portable cable tower and reel apparatus of FIG. 3.

Numerous modifications and alternate embodiments of the method and apparatus of the invention are, of course, possible. Referring to FIGS. 3 and 4, there is shown an alternate embodiment in which a self-mobile electrically powered machine 110 has mounted on it means for suspending a flexible electrical cable 116 from the machine at a height greater than any fixed point on the machine and, preferably, at a height greater than the desired upper operating limit of the bucket 118. The alternate cable suspension means shown in FIG. 3 is of much lighter construction than the rotating turret 22 provided for the FIG. 1 machine. It comprises a rotating turret 122 mounted on a non-rotating base suitably attached as by pivot 164 to the machine 110. An angled brace 166 provides additional rigidity for the base 162. Suitable means are provided for rotatably mounting the turret 122 on the base 162 as, for example, a bearing structure indicated at 168.

The electrical cable 116 is reeved once about a nonrotating sheave 170 and then clamped to the turret 122 before it enters an electrical connector 172. The nonrotating sheave 170 provides a wider area for transmitting tension forces of the suspended cable 116 to the rotating turret 162 so as to eliminate sharp bends and undue force concentrations which might tend to fatigue or break the cable 116.

The electrical connector 172 provides means for transmitting electrical power between the cable 116 and the machine 110. Suitable means for accommodating the relative rotation between the rotating turret 122 and the fixed base 162 may include an electrical slip-ring connection (not shown). Alternatively, the cable may continue through the connector 172 to the machine 110. A length of cable corresponding to the height of the turret base 162 may accommodate up to 360 degrees or more of relative rotation between the turret 122 and the machine 110 by simple twisting of the cable or other flexible connector in the base 162. If an electrical slip-ring connection is not provided, so that relative rotation is accommodated by twisting the cable in the base 162, the operator of the machine 110 will, of course, have to be cognizant of the amount of relative rotation, so that not more than about 360 degrees of rotation in one direction is accumulated before a correcting rotation in the other direction is made. A suitable rotation stop or electrical limit switch could be provided between the turret 122 and the base 162 to prevent over-twisting of the cable between the turret and the body of the machine 110.

Portable means are provided for suspending the cable 116 at a second point spaced from the machine 110. As illustrated in FIGS. 3 and 4, these comprise a portable cable tower 135, including a base 138 and a mast 136. As shown, the mast may be formed of a plurality of telescoping sections so that it can be retracted for storage or moving, and subsequently raised to its full height for operation. If preferred, other means for retracting the mast may be provided, as, for example, pivotally connecting the mast 136 to the base 138.

An idler sheave 139 is provided on the uppermost section 137 of the mast 136. Mast section 137 is mounted for free rotation about its vertical axis, so that the rotating section 137 and idler sheave 139 provide a fairlead for the cable 116, permitting the cable to follow the angular movements of the machine 110 relative to the portable cable tower 135.

Two cable reels on the cable tower 135 provide storage means for additional lengths of flexible electrical cable. Cable reel 124 receives one end of the cable 116 which is suspended between the mast 136 and the turret 122 on machine 110. The reel 124 preferably is provided with conventional apparatus (not shown) for exerting a constant tension on the cable 116, so that additional lengths of the cable will be wound upon the cable reel 124, or payed out from the cable reel 124, automatically as the machine 110 moves closer to or farther from the portable cable tower. Conventional level wind apparatus 126 is provided for assuring that the cable 116 is reeled upon and payed out from the cable reel 124 in an orderly fashion.

A second cable reel 160 is provided on the base of portable cable tower 135 for storing a length of a second flexible electrical cable 117 which extends from the cable tower 135 to a remote source of electrical power (not shown) such as the power source 14 of FIG. 1. As the cable tower 135 is moved about to accommodate different operating positions of the machine 110, additional lengths of cable 117 may be payed out from or reeled in upon the second cable reel 160. Suitable level wind apparatus 174 is provided in connection with the cable reel 160.

A slot 142 in the front of the cable tower base 138 is engagable with the lower blade 144 on the machine bucket 118 to provide means for the tower 135 to be moved by the machine 110 to a new working location within the mine.

Shock absorbing means are provided on the cable tower 135 for accommodating sudden jerks and movements of the cable 116. Preferably these comprise a plurality of shock absorbing pneumatic pads or shoes 176 mounted under the base 138. The pads 176 are provided with pressurized fluid at constant pressure from a central accumulator, such as a compressed air cylinder. The pads then may elongate or compress to accommodate shocks exerted on the cable tower 135 by the flexible cable 116 and, as the pressure in the pads subsequently is equalized, will return the tower to its original vertical position.

Electrical connection means (not shown) are provided between the electrical cable 116 and its reel 124 and the electrical cable 117 and its reel 160, and between the two cable storage reels 160 and 124, to provide for uninterrupted transmission of electrical power between the cables 117 and 116.

Figure 5:
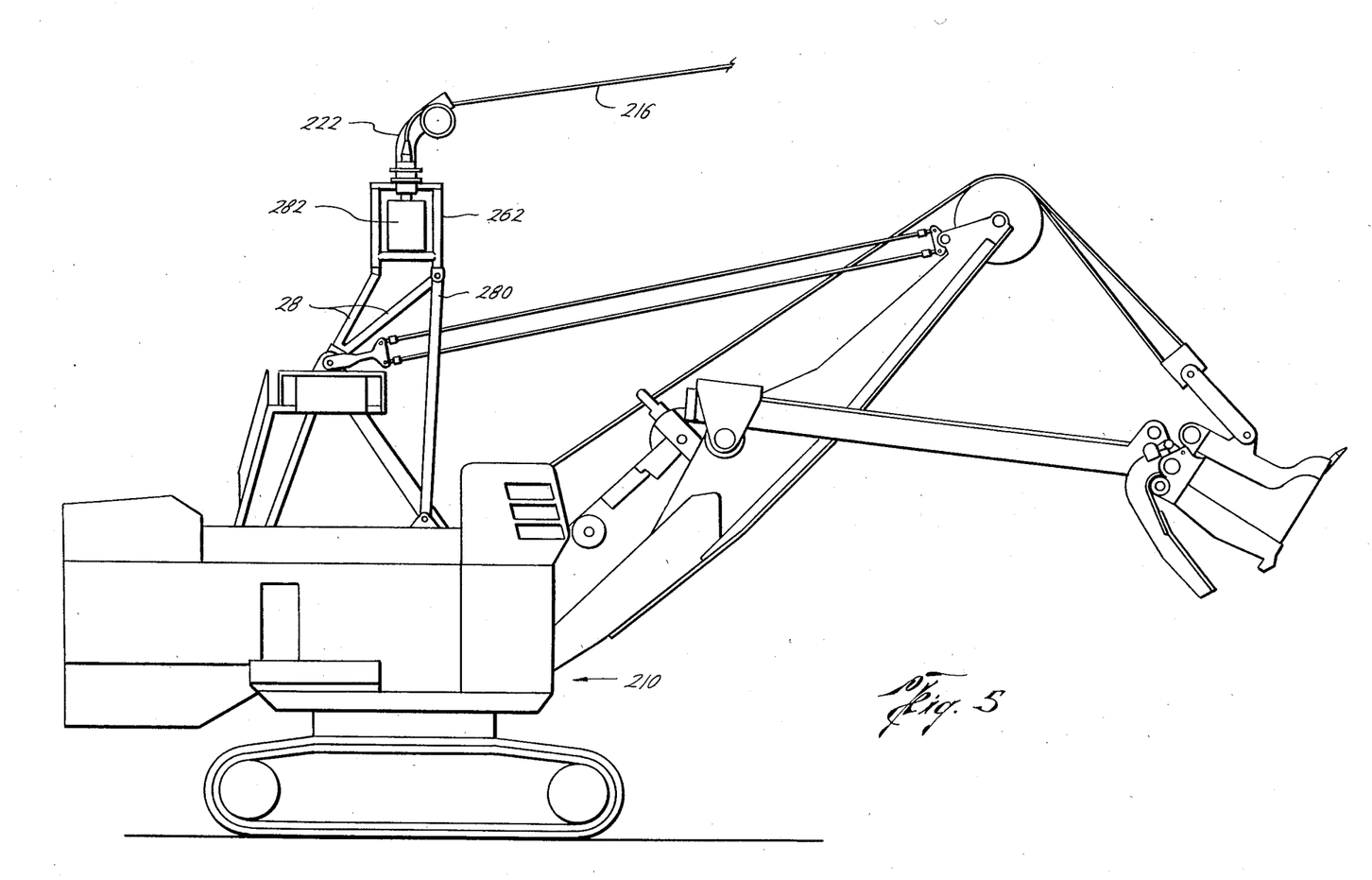
FIG. 5 is a view in side elevation of a conventional electrically powered cable shovel used in mining operations to which the electrical power supply apparatus of the present invention has been added as a retro-fit modification.

In FIG. 5 there is shown a conventional electrically powered cable shovel 210 of a type which is in widespread use in mining operations throughout the world. As now utilized, these machines are provided with electrical power cables which lie on the ground and are dragged behind the machine, or manually moved, as the shovel advances, retreats, etc. This not only causes rapid wear on the cable, but the cable also must be bridged or buried where other traffic passes between the machine and its remote source of electrical power. FIG. 5 illustrates the relative ease with which the method and apparatus of the present invention may be added as a retro-fit modification to such existing machinery. Brackets 280 are attached to the existing machine structure to mount a non-rotating base 262 thereon. A rotating turret 222 is mounted on the base, and has a flexible electrical cable 216 attached thereto in the same manner described in connection with the rotating turret 122 of FIG. 3. The cable 216 thus is suspended at a point higher than any fixed portion of the shovel 210 and is free to rotate about a vertical axis. An electrical slip-ring apparatus 282 provides means for transmitting electrical power between the cable 216 on the rotating turret 222 and the fixed base 262 on the machine 210.

Cable 216 also may be suspended at a second point spaced from the machine 210 by portable means such as the portable cable towers shown in FIGS. 4 and 6 through 9.

Figures 6, 7:
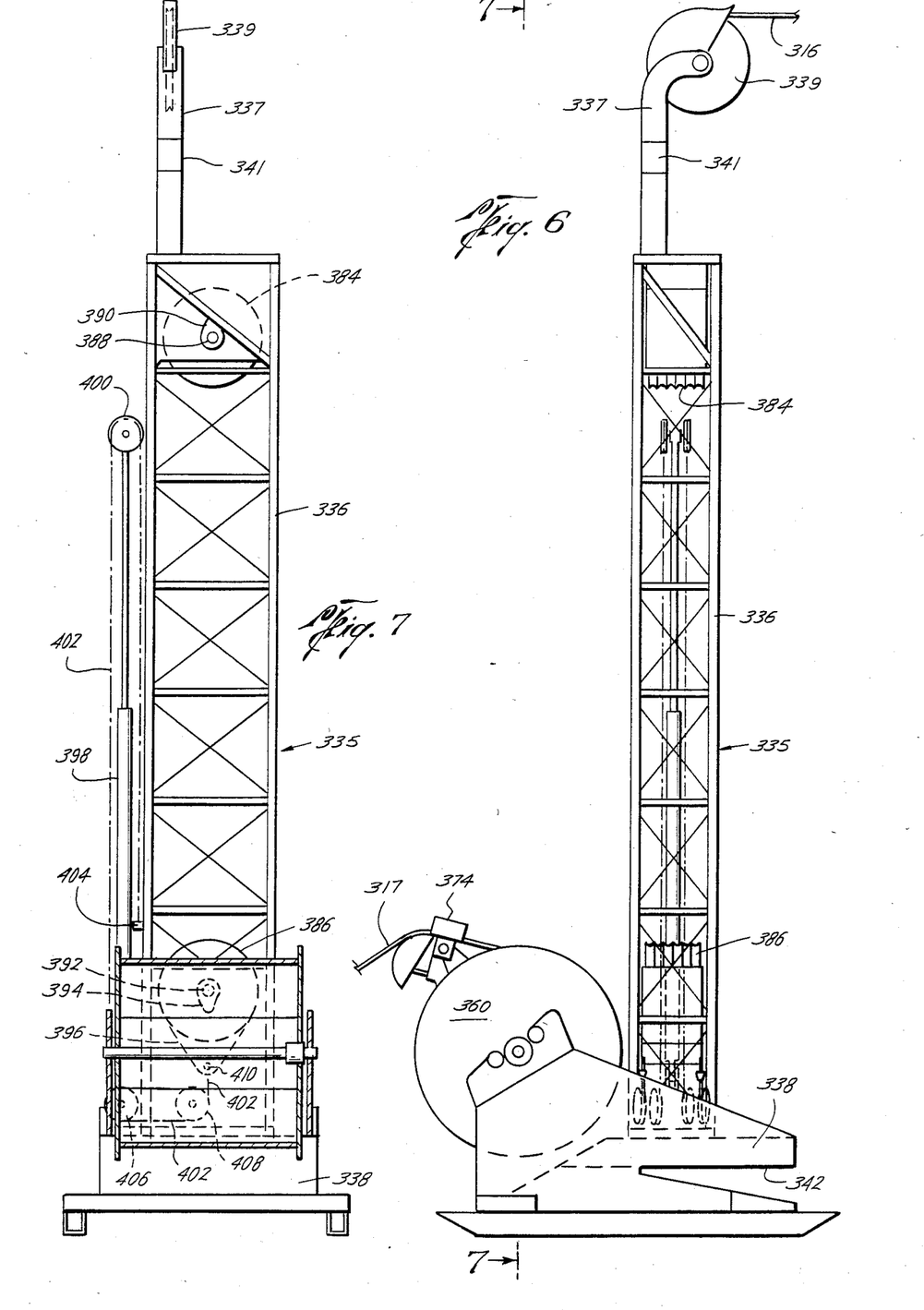
FIG. 6 is a view in side elevation of an alternate form of the portable cable tower of the present invention, including alternate cable storage and automatic tensioning means.
FIG. 7 is a view in side elevation, and partly in section, taken along line 7—7 of FIG. 6.

Referring now to FIGS. 6 and 7, there is illustrated an alternate embodiment of the portable means for suspending the electrical cable at a point spaced from the self-mobile electrically powered machine. A portable cable tower 335 includes a mast 336 mounted on a base 338. An idler sheave 339 is mounted atop the mast 336 on an extension 337. Extension 337 is adapted for 360 degree rotation about its vertical axis with respect to the remainder of the mast 336, as by bearing 341, so as to permit the idler sheave 339 to accommodate angular movements of the suspended electrical cable 316 relative to the mast. The suspended electrical cable 316, which is shown entering the idler sheave 339 in FIG. 6, but is omitted from the remainder of FIGS. 6 and 7 for clarity, is reeved about the idler pulley 339 and then reeved six times about upper and lower six part idler sheaves 384 and 386, respectively. The upper sheave 384 is rotatably mounted on a shaft 388 journaled in bearings 390 attached to the mast 336, and therefore is fixed with respect to the mast 336. The lower sheave 386 is rotatably mounted on a shaft 392 journaled in bearings 394 attached to a floating block 396 and therefore is a "floating" sheave, moveable vertically with respect to the mast 336.

Means are provided for applying constant tension to the floating sheave 386. Preferably these comprise an extensible hydraulic cylinder 398 having a pair of idler sheaves 400 on the upper end thereof. A pair of wire ropes, indicated by dot and dash lines 402, each have one of their ends fixidly attached to the mast 336, as by clamps 404. The other ends of the wire ropes 402 are reeved about the idler pulleys 400 atop the extensible cylinder 398 and thence about two pairs of idler pulleys 406 and 408 and finally are attached through eyelets 410 to the lower end of the floating block 396 holding the floating sheave 386.

With this arrangement, when the cylinder 398 is supplied with pressurizing fluid, such as compressed nitrogen or air, at a constant pressure, a constant tension will be applied by means of the wire ropes 402 to the floating block 396 and sheave 386, and thence to the electrical cable reeved about the floating sheaves 386 and fixed sheave 384.

Longitudinal movements of the electrical cable 316 toward or away from the cable tower 335, responsive to movements of an electrical machine to which the cable 316 is attached, may be accommodated by floating sheave 386 moving closer to, or farther away from, the fixed sheave 384 to respectively pay out or take in additional cable 316. Since the cable 316 is reeved six times about each of the floating and fixed sheaves, it will be apparent that approximately one foot of vertical movement of the floating sheave 386 relative to the fixed sheave 384 will take in or pay out approximately 12 feet of the flexible electrical cable 316. Similarly, since the wire ropes 402 are reeved about the idler pulleys 400 on the cylinder 398, and tied off below the pulleys, approximately one foot of vertical movement of the floating sheave 386 will necessitate an approximately one-half foot extension or retraction of the cylinder 398. Suitable adjustments in the number of reeves about the idler and fixed sheaves 384 and 386, and the vertical distance between the sheaves and the dimensions of other parts may be made by those skilled in the art to accommodate the necessary linear amount of extensions and retractions of the electrical cable 316 under its desired operating conditions.

In the preferred reeving pattern, the electrical cable 316 is reeved about the upper idler sheave 339 and extends from there down to, and is reeved about, the lower floating sheave 386, is subsequently reeved about the upper and lower sheaves the desired number of times, and, after the last reeving about the fixed upper sheave 384 is tied off or connected to the structure of the mast 336. From this point, an electrical connection extends to a cable storage reel 360 provided on the portable cable tower base 338. Cable storage reel 360 stores an additional length of a second cable 317 which extends between the base 338 and a remote source of electrical power. A level wind apparatus 374 is provided for laying the cable 317 properly on the cable reel 360.

The cable tower base 338 also includes a slot 342 permitting the base 338 and related equipment mounted thereon to be lifted and moved to a new location when it is desired to move the operating location of the machine with which the portable cable tower is utilized.

In the cable tower embodiment illustrated in FIGS. 6 and 7, the electrical cable, being reeved about the relatively short radius fixed and floating sheaves, will be subject to substantial wear if the cables cycle substantially continuously due to rapid back and forth movement of the equipment in connection with which it is used. Therefore, the FIGS. 6 and 7 embodiment may be preferred for use in connection with relatively slow moving equipment, such as very large earth movers and drag lines which advance at only about two miles per hour.

Figure 8:
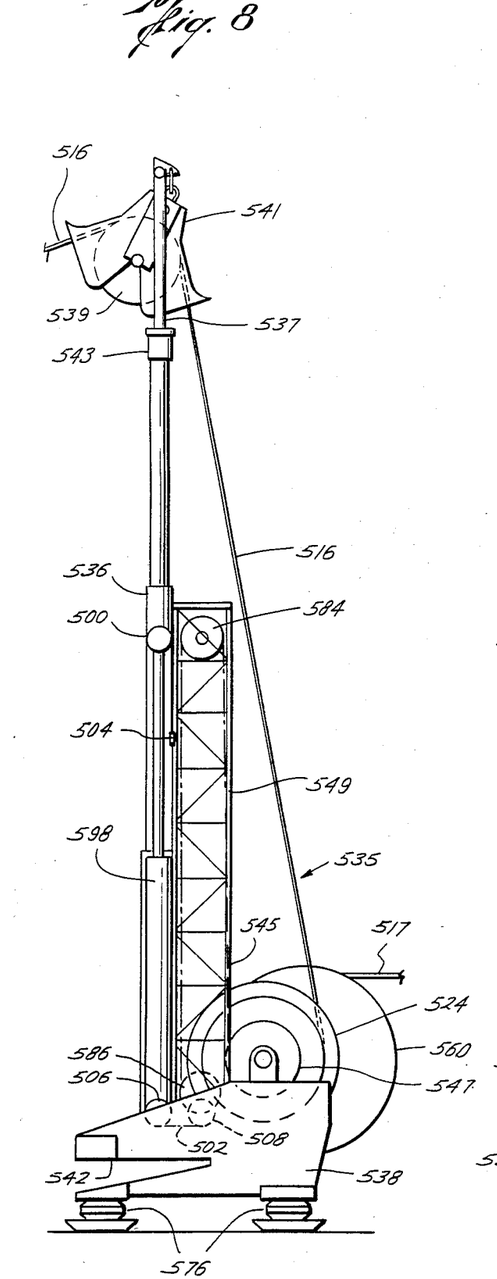
FIG. 8 is a view in elevation of another form of the portable cable tower of the present invention including further alternate cable storage and tensioning means.
Figure 9:
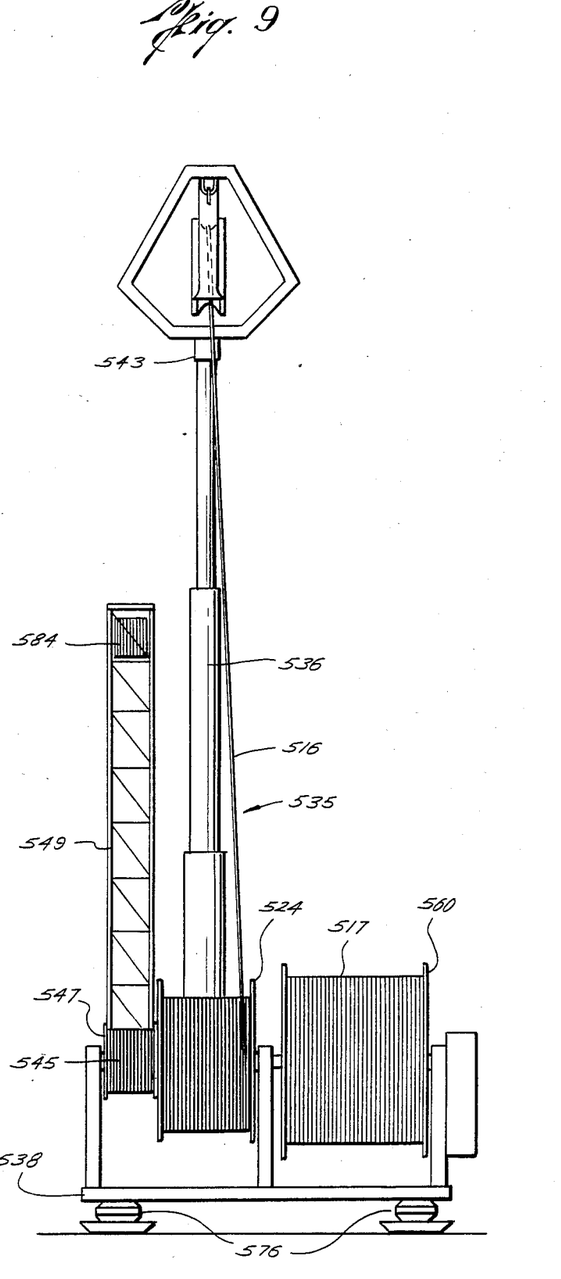
FIG. 9 is a view in side elevation of the apparatus of FIG. 8.

For more rapidly cycling equipment, an alternate embodiment of the portable cable tower is illustrated in FIGS. 8 and 9. There is shown a portable cable tower 535 including a base 538, mounted on shock absorbing pneumatic pads 576, a mast 536, comprised of a plurality of telescoping sections, and first and second cable reels 524 and 560. The base 538 includes a pick-up slot 542.

Suspended flexible electrical cable 516, which may extend to the turret on a piece of self-mobile electrically powered equipment such as the shovels 110 or 210, is reeved around an idler sheave 539 mounted in a block assembly 541 suspended from an extension 537 on the mast 536. A bearing assembly 543 permits the upper portion of the mast extension 537, and the block 541 and idler sheave 539, to rotate freely about a vertical axis so that the suspended cable 516 may follow the movements of the electrically powered equipment to which it is attached.

From the sheave 539, the cable 516 extends down to, and is wound upon, the cable storage reel 524. A second length of flexible electrical cable 517 is stored on the cable reel 560 and extends from there to a remote source of electrical power. Conventional means, not shown, are provided for continuous transmission of electrical power between the cables 517 and 516 on reels 524 and 560, respectively. Although not shown in FIGS. 8 and 9, conventional level wind apparatus may be used on cable storage reels 524 and 560 to assure that the electrical cables 516 and 517 are wound upon and payed out from their respective reels in orderly fashion.

Tensor means are provided for maintaining essentially constant tension on the cable storage reel 524, and cable 516, to permit the cable 516 to be payed out from, or wound in upon, the cable storage reel 524 automatically in response to movements of the associated electrical equipment toward or away from the portable cable tower 535.

Means for providing constant tension to the cable storage reel 524 and electrical cable 516 comprise a tensor cable 545, preferably of wire rope, wound upon a tensor drum 547 mounted co-axially with, and rotatable with, the cable storage reel 524. Tensor cable 545 is also reeved about upper and lower six part sheaves 584 and 586 in a tensor column 549. Upper six part sheave 584 is a fixed sheave rotatably mounted in the upper portion of the column 549, while lower six part sheave 586 is a floating sheave. In the preferred reeving pattern, tensor cable 545 is wound upon the tensor drum 547 and from there extends upwardly to and over the first part of the fixed upper sheave 584, downwardly about the first part of the floating lower sheave 586, is subsequently reeved about each of the six parts of the upper and lower sheaves and, after the last reeving about the lower sheave 586, is tied off to the sheave 586, or to a portion of the column 549 between the upper and lower sheaves. The floating lower sheave 586 is placed under constant tension by means of a wire rope 502 attached to the lower sheave 586 and extending around idler sheaves 506 and 508 on the base 538 and around idler sheave 500 on the upper portion of the pneumatic cylinder 598. The wire rope 502 is then tied off, as by clamp 504 to the structure of the column 549. The operation of the pneumatic cylinder 598 is the same as that for the cylinder 398 on the embodiment of the portable cable tower shown in FIGS. 6 and 7.

With this structure, it will be apparent that as tension on the cable 516 is increased or decreased responsive to movement of the powered electrical machinery toward or away from the portable cable tower 535, additional lengths of the electrical cable 516 will be wound upon, or payed out from, the cable storage reel 524. As additional cable is wound upon the cable storage reel 524, a corresponding length of the tensor cable 545 will be payed out from the tensor drum 547 and will be accommodated by a downward movement of the floating sheave 586 relative to the fixed sheave 584 and by an extension of the pneumatic cylinder 598. The paying out of additional lengths of cable 516 will reverse the process. It will be apparent to those skilled in the art that a designer of the equipment may select desired relationships and dimensions for the height of cylinder 598, column 549, the number of parts of the upper and lower sheaves 584 and 586 and the dimension of the cable tensor drum 547 in order to provide for the necessary play in the tensor cable 545 to accommodate the desired range of linear movement of the electrical cable 516 on the cable storage reel 524.

The foregoing disclosure and description of the invention are illustrative and explanatory thereof and various changes may be made in the size, shape and materials of construction without departing from the spirit of the invention as set forth in the appended claims.

What is claimed is:

1. In a self-mobile electrically powered machine, the improvement comprising:
    an elongated flexible cable supplying electrical power to said machine from a remote cable tower;
    suspension means mounted on said machine for rotation about a vertical axis for suspending said cable from said machine, the point of suspersion of said cable from said suspension means being at a height greater than any other fixed portion of said machine, whereby said machine, while being supplied with electrical power through said cable, has 360° freedom of movement without fouling said cable suspended from said suspension means; and
    engagement means on said machine adapted to engage and lift said remote cable tower for movement of said remote power source to a different operating location while said machine is still being supplied with power through said flexible cable.

2. The apparatus according to claim 1 comprising additionally:
    a cable reel on said machine for reeling in said paying out said cable; and
    means associated with said cable reel for exerting a substantially constant tension on said cable, whereby incremental lengths of said cable will be automatically reeled in and payed out from said reel to accommodate movements of said machine.

3. The apparatus according to claim 2 comprising additionally:
    a level wind apparatus on said cable; and
    a fairlead through which said cable is fed to said level wind apparatus and said cable reel, said fairlead comprising an arm pivotally mounted on said turret, a roller rotatably mounted on said arm and shock absorbing means interconnecting said arm said said turret.

4. The apparatus according to claim 3 wherein said shock absorbing means comprises a double acting cylinder supplied with pressurizing fluid.

5. An apparatus comprising:
    a self-mobile electrically powered machine;
    a flexible cable for supplying electrical power to said machine from a remote power source;
    suspension means on said machine and rotatable about a vertical axis for suspending said cable therefrom at a first point where said cable exits said suspension means, said first point being at a height greater than any other fixed portion of said machine;
    portable means for suspending said cable at a second point spaced from said machine, said second point also being higher than any fixed portion of said machine, whereby said cable may be suspended in an unsupported span between said portable means and said suspension means on said machine to provide a working area within which said machine may have 360° freedom of operation without fouling said cable; and
    means on said portable means for engagement by said machine, whereby said portable means may be engaged by said machine and moved to a new location while said machine is still being supplied with power through said flexible cable.

6. The apparatus according to claim 5 comprising additionally cable storage means for storage of a portion of said flexible cable, said cable storage means being located on at least one of said machine and said portable means.

7. The apparatus according to claim 6 wherein said cable storage means comprises a cable storage reel.

8. The apparatus according to claim 6 wherein said cable storage means comprises a pair of spaced apart sheaves.

9. The apparatus according to claim 6 comprising additionally means for automatically taking in and paying out portions of said cable stored on said cable storage means responsive to movements of said machine relative to said portable means.

10. The apparatus according to claim 9 wherein said means for automatically taking in and paying out said cable comprise means associated with said cable storage means for exerting a substantially constant tension on said cable.

11. The apparatus according to claim 5 comprising additionally shock absorbing means for absorbing shocks from limited movements of said cable, said shock absorbing means being located on at least one of said suspension means and said portable means.

12. The apparatus according to claim 5 wherein said suspension means comprises a turret mounted on said machine for rotation about the vertical axis of said turret and comprising additionally a cable storage reel mounted on said turret and rotatable therewith.

13. The apparatus according to claim 5 wherein said portable means for suspending said cable comprise a portable cable tower and comprising additionally a cable storage reel mounted on said portable cable tower.

14. A portable apparatus for suspending an electrical cable between said apparatus and a self-mobile electrically powered machine being supplied with electrical power through said cable, said portable apparatus comprising:
 a base;
 an elongated mast on said base;
 means on said mast for suspending said cable therefrom;
 storage means on said apparatus for storing a portion of said cable;
 tensioning means associated with such storage means for supplying a pre-determined tension to said cable, whereby incremental lengths of said cable will be automatically stored on said storage means and payed out from said storage means responsive to movements of said machine toward and away from said portable apparatus; and
 engagement means on said portable apparatus adapted for engagement by said machine, whereby said portable apparatus may be engaged and lifted by said machine for movement to a new location, while said machine is being supplied with power through said electrical cable suspended from said portable apparatus.

15. The apparatus according to claim 14 wherein said mast is adjustable between a lowered position and a raised position, whereby said mast may be placed in said lowered position for movement and storage of said portable apparatus and subsequently placed in said raised position for operation of said portable apparatus.

16. The apparatus according to claim 15 wherein said mast is comprised of a plurality of telescoping sections.

17. A portable apparatus for suspending an electrical cable between said apparatus and a self-mobile electrically powered machine being supplied with electrical power through said cable, said portable apparatus comprising;
 a base;
 an elongated mast on said base;
 means on said mast for suspending said cable therefrom;
 cable storage means on said apparatus for storing a portion of said cable, said cable storage means comprising a first idler sheave fixed with respect to said apparatus and a second idler sheave floating with respect to said apparatus, whereby a portion of said cable may be reeved about said sheaves for storage and variations in the amount of cable stored on said sheaves may be accommodated by movement of said floating sheave toward and away from said fixed sheave;
 means for exerting a substantially constant tension on the cable stored on said sheaves, said means for exerting substantially constant tension comprising an expandable cylinder containing a pressurizing fluid at a substantially constant pressure, said cylinder being operatively connected to said floating sheave,
 whereby lengths of said cable will be automatically payed out from said sheaves responsive to movements of said machine away from said apparatus and lengths of said cable will be automatically stored upon said sheaves responsive to movements said machine toward said apparatus.

18. The apparatus according to claim 17 wherein each of said sheaves is a six part sheave, whereby approximately twelve feet of said electrical cable will be payed out from said storage means for each one foot of movement of said floating sheave toward said fixed sheave and approximately twelve feet of additional length of said cable will be stored upon said sheaves for each one foot of movement of said floating sheave away from said fixed sheave.

19. The apparatus according to claim 17 comprising additionally means on said apparatus engageable by said machine, whereby said apparatus may be engaged by said machine for movement to a new working location.

20. The apparatus according to claim 17 comprising additionally a cable storage reel on said apparatus for storing a length of a second electrical cable extending between said apparatus and a remote power source.

21. A portable apparatus for suspending an electrical cable between said apparatus and a self-mobile electrically powered machine being supplied with electrical power through said cable, said portable apparatus comprising:
 a base;
 an elongated mast on said base;
 means on said mast for suspending said cable therefrom;
 a cable reel on said apparatus for storing a portion of said cable; and
 means for applying a substantially uniform tension to said cable, said means comprising,
 a tensioning drum co-axial with, and rotatable with, said cable storage reel,
 a wire rope attached to said tensioning drum, and
 an expandable cylinder containing a pressurizing fluid at substantially uniform pressure and adapted to exert a substantially uniform tension on said wire rope,
 whereby a substantially uniform rotational force is applied to said cable storage reel and a substantially uniform tension is applied to said cable, so that when said machine moves farther away from said apparatus for suspending said cable, said tension in said cable will exceed said substantially uniform tension exerted by said tensioning means, causing additional cable to be payed out from said storage reel and an additional length of said wire rope to be wound onto said tensioning drum, and when said machine moves towards said portable apparatus for suspending said cable, the tension in said cable will be reduced to below the amount of substantially uniform tension exerted by said tensioning means, causing said cylinder to expand and paying out a length of said wire rope from said tensioning drum and reeling in an additional length of said cable onto said cable storage reel.

22. The apparatus according to claim 21 comprising additionally means on said portable apparatus for engagement by said machine, whereby said portable apparatus may be moved by said machine to a new location.

23. The apparatus according to claim 21 comprising additionally a fixed sheave and a floating sheave on said apparatus in spaced apart relationship and having a length of said wire rope attached to said tensioning drum reeved thereabout, said expansible cylinder being adapted to exert a substantially uniform force on said floating sheave, to thereby exert said substantially uniform tension on said wire rope.

24. The method for operating a self-mobile electrically powered machine comprising:

supplying electrical power to said machine by means of a flexible electrical cable extending between said machine and a remote source of electrical power;

suspending a portion of said cable between a rotatable means on said machine and a portable cable suspension means spaced from said machine at a first location;

operating said machine within a first area proximate said first location; and utilizing said machine to move said portable cable suspension means to a second location, while said machine continues to be supplied with electrical power through said flexible electrical cable, when it is desired to operate said machine in a second area proximate said second location.

* * * * *